US007715562B2

(12) United States Patent
Yegani et al.

(10) Patent No.: US 7,715,562 B2
(45) Date of Patent: May 11, 2010

(54) SYSTEM AND METHOD FOR ACCESS AUTHENTICATION IN A MOBILE WIRELESS NETWORK

(75) Inventors: Parviz Yegani, Danville, CA (US); Joseph A. Salowey, Seattle, WA (US); Jayaraman R. Iyer, Sunnyvale, CA (US); Anand K. Oswal, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 871 days.

(21) Appl. No.: 11/419,382

(22) Filed: May 19, 2006

(65) Prior Publication Data

US 2007/0217610 A1 Sep. 20, 2007

Related U.S. Application Data

(60) Provisional application No. 60/780,176, filed on Mar. 6, 2006.

(51) Int. Cl.
*H04K 1/00* (2006.01)

(52) U.S. Cl. .......................................... 380/270; 726/4
(58) Field of Classification Search ................. 380/270; 713/168, 155; 455/411
See application file for complete search history.

(56) References Cited

U.S. PATENT DOCUMENTS

| 5,602,907 | A | 2/1997 | Hata et al. ................... 379/114 |
|---|---|---|---|
| 5,822,411 | A | 10/1998 | Swale et al. ................. 379/111 |
| 5,828,737 | A | 10/1998 | Sawyer ........................ 379/114 |
| 5,905,736 | A | 5/1999 | Ronen et al. ................. 370/546 |
| 5,909,238 | A | 6/1999 | Nagashima et al. ............ 348/3 |
| 5,946,670 | A | 8/1999 | Motohashi et al. .......... 705/400 |
| 5,956,391 | A | 9/1999 | Melen et al. ................. 379/114 |
| 5,970,477 | A | 10/1999 | Roden .......................... 705/32 |
| 5,987,498 | A | 11/1999 | Athing et al. ............... 709/203 |
| 6,016,509 | A | 1/2000 | Dedrick ....................... 709/224 |
| 6,035,281 | A | 3/2000 | Crosskey et al. .............. 705/14 |
| 6,047,051 | A | 4/2000 | Ginzboorg et al. .......... 379/130 |
| 6,070,192 | A | 5/2000 | Holt et al. ................... 709/227 |
| 6,075,854 | A | 6/2000 | Copley et al. ............... 379/211 |
| 6,131,024 | A | 10/2000 | Boltz .......................... 455/405 |

(Continued)

FOREIGN PATENT DOCUMENTS

WO   WO 98/26381   12/1997

(Continued)

OTHER PUBLICATIONS

Draft—TR45—PN-3-4732-RV4 (to be published as TIA-835.1-D), 32 pages.

(Continued)

*Primary Examiner*—Jung Kim
*Assistant Examiner*—Samson B Lemma
(74) *Attorney, Agent, or Firm*—Baker Botts L.L.P.

(57) ABSTRACT

A system and method is provided for authenticating access in a mobile wireless network. The system and method comprise exchanging an extensible authentication protocol (EAP) packet with an access terminal over a high rate packet data radio link and a signaling interface through a radio access network, encapsulating the EAP packet in an authentication authorization and accounting (AAA) packet, and sending the AAA packet to an authentication server for authentication.

21 Claims, 3 Drawing Sheets

U.S. PATENT DOCUMENTS

| | | | |
|---|---|---|---|
| 6,137,791 A | 10/2000 | Frid et al. | 370/352 |
| 6,141,684 A | 10/2000 | McDonald et al. | 709/222 |
| 6,175,879 B1 | 1/2001 | Shah et al. | 709/330 |
| 6,208,977 B1 | 3/2001 | Hernandez et al. | 705/34 |
| 6,282,573 B1 | 8/2001 | Darago et al. | 709/229 |
| 6,295,447 B1 | 9/2001 | Reichelt et al. | 455/417 |
| 6,330,562 B1 | 12/2001 | Boden et al. | 707/10 |
| 6,332,163 B1 | 12/2001 | Bowman-Amuah | 709/231 |
| 6,339,832 B1 | 1/2002 | Bowman-Amuh | 714/35 |
| 6,434,568 B1 | 8/2002 | Bowman-Amuah | 707/103 R |
| 6,434,628 B1 | 8/2002 | Bowman-Amuah | 714/48 |
| 6,438,594 B1 | 8/2002 | Bowman-Amuah | 709/225 |
| 6,442,748 B1 | 8/2002 | Bowman-Amuah | 717/108 |
| 6,466,964 B1 | 10/2002 | Leung et al. | 709/202 |
| 6,477,580 B1 | 11/2002 | Bowman-Amuah | 709/231 |
| 6,477,665 B1 | 11/2002 | Bowman-Amuah | 714/39 |
| 6,480,485 B1 | 11/2002 | Kari et al. | 370/352 |
| 6,490,451 B1 | 12/2002 | Denman et al. | 455/436 |
| 6,493,547 B1 | 12/2002 | Raith | 455/405 |
| 6,496,850 B1 | 12/2002 | Bowman-Amuah | 709/203 |
| 6,502,213 B1 | 12/2002 | Bowman-Amuah | 714/49 |
| 6,510,513 B1 | 1/2003 | Danieli | 713/156 |
| 6,529,909 B1 | 3/2003 | Bowman-Amuh | 707/10 |
| 6,529,948 B1 | 3/2003 | Bowman-Amuah | 709/217 |
| 6,539,396 B1 | 3/2003 | Bowman-Amuah | 707/103 R |
| 6,549,949 B1 | 4/2003 | Bowman-Amuah | 709/236 |
| 6,550,057 B1 | 4/2003 | Bowman-Amuah | 717/126 |
| 6,571,282 B1 | 5/2003 | Bowman-Amuah | 709/219 |
| 6,578,068 B1 | 6/2003 | Bowman-Amuah | 709/203 |
| 6,601,192 B1 | 7/2003 | Bowman-Amuah | 714/38 |
| 6,601,234 B1 | 7/2003 | Bowman-Amuah | 717/108 |
| 6,606,660 B1 | 8/2003 | Bowman-Amuah | 709/227 |
| 6,611,821 B2 | 8/2003 | Stahl et al. | 705/400 |
| 6,615,199 B1 | 9/2003 | Bowman-Amuah | 706/50 |
| 6,615,253 B1 | 9/2003 | Bowman-Amuah | 709/219 |
| 6,615,263 B2 | 9/2003 | Dulai et al. | 709/225 |
| 6,621,820 B1 | 9/2003 | Williams et al. | 370/395.31 |
| 6,636,242 B2 | 10/2003 | Bowman-Amuah | 715/764 |
| 6,640,238 B1 | 10/2003 | Bowman-Amuah | 709/201 |
| 6,640,244 B1 | 10/2003 | Bowman-Amuah | 709/207 |
| 6,647,262 B1 | 11/2003 | Demetrescu et al. | 455/436 |
| 6,665,537 B1 | 12/2003 | Lioy | 455/435 |
| 6,665,718 B1 | 12/2003 | Chuah et al. | 709/225 |
| 6,671,675 B2 | 12/2003 | Iwamura | 705/30 |
| 6,684,243 B1 | 1/2004 | Euget et al. | 709/222 |
| 6,684,256 B1 | 1/2004 | Warrier et al. | 709/238 |
| 6,708,225 B1 | 3/2004 | Cho et al. | 709/317 |
| 6,714,515 B1 | 3/2004 | Marchand | 370/231 |
| 6,715,145 B1 | 3/2004 | Bowman-Amuah | 718/101 |
| 6,728,266 B1 | 4/2004 | Sabry et al. | 370/468 |
| 6,728,365 B1 | 4/2004 | Li et al. | 379/329 |
| 6,728,884 B1 | 4/2004 | Lim | 713/201 |
| 6,742,015 B1 | 5/2004 | Bowman-Amuah | 718/101 |
| 6,742,036 B1 | 5/2004 | Das et al. | 709/226 |
| 6,757,371 B2 | 6/2004 | Kim et al. | 379/114.22 |
| 6,760,444 B1 | 7/2004 | Leung | 380/270 |
| 6,768,726 B2 | 7/2004 | Dorenbosch et al. | 370/331 |
| 6,769,000 B1* | 7/2004 | Akhtar et al. | 707/103 R |
| 6,771,623 B2 | 8/2004 | Ton | 370/331 |
| 6,785,256 B2 | 8/2004 | O'Neill | 370/338 |
| 6,804,518 B2 | 10/2004 | Core et al. | 455/436 |
| 6,826,173 B1 | 11/2004 | Kung et al. | 370/352 |
| 6,829,709 B1 | 12/2004 | Acharya et al. | 713/160 |
| 6,834,341 B1 | 12/2004 | Bahl et al. | 713/156 |
| 6,839,338 B1 | 1/2005 | Amara et al. | 370/338 |
| 6,842,906 B1 | 1/2005 | Bowman-Amuah | 719/330 |
| 6,856,676 B1 | 2/2005 | Pirot et al. | 379/201.01 |
| 6,889,321 B1 | 5/2005 | Kung et al. | 713/153 |
| 6,907,501 B2 | 6/2005 | Tariq et al. | 711/118 |
| 6,910,074 B1 | 6/2005 | Amin et al. | 709/227 |
| 6,915,345 B1 | 7/2005 | Tummala et al. | 709/225 |
| 6,917,605 B2 | 7/2005 | Kakemizu et al. | 370/338 |
| 6,920,503 B1 | 7/2005 | Nanji et al. | 709/230 |
| 6,922,404 B1 | 7/2005 | Narayanan et al. | 370/338 |
| 6,925,160 B1 | 8/2005 | Stevens et al. | 379/121.05 |
| 6,947,401 B2 | 9/2005 | El-Malki et al. | 370/331 |
| 6,961,774 B1 | 11/2005 | Shannon et al. | 709/227 |
| 6,967,941 B2 | 11/2005 | Roy | 370/338 |
| 6,978,128 B1 | 12/2005 | Raman et al. | 455/414 |
| 6,980,802 B2 | 12/2005 | Jung | 455/436 |
| 6,980,962 B1 | 12/2005 | Arganbright et al. | 705/26 |
| 6,981,047 B2 | 12/2005 | Hanson et al. | 709/227 |
| 6,982,967 B1 | 1/2006 | Leung | 370/328 |
| 6,990,337 B2 | 1/2006 | O'Neill et al. | 455/422.1 |
| 6,993,333 B2 | 1/2006 | Laroia et al. | 455/436 |
| 7,003,294 B2 | 2/2006 | Singhai et al. | 455/435.1 |
| 7,020,697 B1 | 3/2006 | Goodman et al. | 709/223 |
| 7,024,687 B2 | 4/2006 | Chaudhuri et al. | 726/3 |
| 7,028,311 B2 | 4/2006 | Roach et al. | 719/328 |
| 7,039,027 B2 | 5/2006 | Bridgelall | 370/329 |
| 7,054,268 B1 | 5/2006 | Paranteinen et al. | 370/231 |
| 7,079,499 B1 | 7/2006 | Akhtar et al. | 370/310 |
| 7,082,301 B2 | 7/2006 | Jagadeesan et al. | 455/436 |
| 7,103,359 B1 | 9/2006 | Heinonen et al. | 455/436 |
| 7,127,234 B2 | 10/2006 | Ishii | 455/411 |
| 7,130,286 B2 | 10/2006 | Koodli et al. | 370/331 |
| 7,133,386 B2 | 11/2006 | Holur et al. | 370/331 |
| 7,151,758 B2 | 12/2006 | Kumaki et al. | 370/331 |
| 7,154,868 B1 | 12/2006 | Sharma et al. | 370/331 |
| 7,161,914 B2 | 1/2007 | Shoaib et al. | 370/331 |
| 7,171,555 B1 | 1/2007 | Salowey et al. | 713/156 |
| 7,184,418 B1 | 2/2007 | Baba et al. | 370/331 |
| 7,187,931 B2 | 3/2007 | Trossen | 455/440 |
| 7,190,793 B2 | 3/2007 | Hsu | 380/270 |
| 7,197,763 B2 | 3/2007 | Hsu | 726/4 |
| 7,212,821 B2 | 5/2007 | Laroia et | 455/437 |
| 7,230,951 B2 | 6/2007 | Mizell, et al. | 370/401 |
| 7,233,583 B2 | 6/2007 | Asthana et al. | 370/332 |
| 7,251,733 B2 | 7/2007 | Haverinen et al. | 713/182 |
| 7,263,371 B2 | 8/2007 | Das et al. | 455/456.1 |
| 7,269,727 B1 | 9/2007 | Mukherjee et al. | 713/160 |
| 7,272,122 B2 | 9/2007 | Trossen et al. | 370/331 |
| 7,272,123 B2 | 9/2007 | Wall | 370/331 |
| 7,275,156 B2 | 9/2007 | Balfanz et al. | 713/168 |
| 7,389,106 B2 | 6/2008 | Dawson et al. | 455/406 |
| 2001/0023428 A1 | 9/2001 | Miyazaki et al. | 709/201 |
| 2002/0021681 A1 | 2/2002 | Madour | 370/331 |
| 2002/0023174 A1 | 2/2002 | Garrett et al. | 709/245 |
| 2002/0036982 A1 | 3/2002 | Chen | 370/230 |
| 2002/0059114 A1 | 5/2002 | Cockrill et al. | 705/27 |
| 2002/0091802 A1 | 7/2002 | Paul et al. | 709/220 |
| 2002/0138601 A1 | 9/2002 | Piponius et al. | 709/223 |
| 2002/0151312 A1 | 10/2002 | Bos et al. | 455/452 |
| 2003/0021252 A1 | 1/2003 | Harper et al. | 370/338 |
| 2003/0039237 A1 | 2/2003 | Forslow | 370/352 |
| 2003/0154400 A1 | 8/2003 | Pirttimaa et al. | 713/201 |
| 2003/0187817 A1 | 10/2003 | Agrawal et al. | 707/1 |
| 2003/0217165 A1 | 11/2003 | Buch et al. | 709/229 |
| 2004/0114553 A1* | 6/2004 | Jiang et al. | 370/328 |
| 2004/0162876 A1 | 8/2004 | Kohavi | 709/203 |
| 2004/0162892 A1 | 8/2004 | Hsu | 709/221 |
| 2004/0196821 A1 | 10/2004 | Haddad et al. | 370/349 |
| 2004/0210524 A1 | 10/2004 | Benenati et al. | 705/40 |
| 2004/0214576 A1* | 10/2004 | Myers et al. | 455/445 |
| 2004/0259562 A1 | 12/2004 | Madour | 455/452.2 |
| 2005/0002407 A1 | 1/2005 | Shaheen et al. | 370/401 |
| 2005/0025132 A1 | 2/2005 | Harper et al. | 370/352 |
| 2005/0130659 A1* | 6/2005 | Grech et al. | 455/436 |
| 2005/0149651 A1 | 7/2005 | Doak et al. | 710/52 |
| 2005/0176428 A1 | 8/2005 | Gabor et al. | 455/435.1 |
| 2005/0195766 A1 | 9/2005 | Nasieiski et al. | 370/331 |
| 2005/0201324 A1 | 9/2005 | Zheng | 370/328 |
| 2005/0213606 A1 | 9/2005 | Huang et al. | 370/467 |
| 2005/0220039 A1 | 10/2005 | Hoshino et al. | 370/261 |

| | | | |
|---|---|---|---|
| 2005/0278420 A1 | 12/2005 | Hartikainen et al. | 709/203 |
| 2005/0286709 A1 | 12/2005 | Horton et al. | 379/265.09 |
| 2006/0014547 A1 | 1/2006 | Walter | 455/456.1 |
| 2006/0018272 A1 | 1/2006 | Mutikainen et al. | 370/328 |
| 2006/0077924 A1* | 4/2006 | Rune | 370/328 |
| 2006/0116113 A1 | 6/2006 | Gass | 455/414.4 |
| 2006/0126630 A1 | 6/2006 | Shirazipour et al. | 370/392 |
| 2006/0171310 A1 | 8/2006 | Ahluwalia et al. | 370/229 |
| 2006/0251038 A1 | 11/2006 | Tamura et al. | 370/342 |
| 2006/0253703 A1* | 11/2006 | Eronen et al. | 713/156 |
| 2006/0264207 A1 | 11/2006 | Tamura et al. | 455/415 |
| 2006/0268819 A1 | 11/2006 | Chen et al. | 370/349 |
| 2007/0008882 A1 | 1/2007 | Oran | 370/229 |
| 2007/0036312 A1 | 2/2007 | Cai et al. | 379/126 |
| 2007/0086582 A1 | 4/2007 | Tai et al. | 379/114.01 |
| 2007/0094712 A1 | 4/2007 | Gibbs et al. | 726/3 |
| 2007/0101122 A1* | 5/2007 | Guo | 713/153 |
| 2007/0121615 A1 | 5/2007 | Weill et al. | 370/389 |
| 2007/0121642 A1 | 5/2007 | Battin et al. | 370/395.2 |
| 2007/0153720 A1* | 7/2007 | Baglin et al. | 370/328 |
| 2007/0254661 A1 | 11/2007 | Chowdhury | 455/436 |
| 2007/0291756 A1 | 12/2007 | Akhtar et al. | 370/392 |

FOREIGN PATENT DOCUMENTS

| | | |
|---|---|---|
| WO | WO 99/31610 | 12/1998 |
| WO | WO 2005/107297 | 11/2005 |

OTHER PUBLICATIONS

Draft—TR45—PN-3-4732-RV4 (to be published as TIA-835.2-D), 93 pages.
Draft—TR45—PN-3-4732-RV4 (to be published as TIA-835.3-D) 36 pages.
Draft—TR45—PN-3-4732-RV4 (to be published as TIA-835.4-D), 70 pages.
Draft—TR45—PN-3-4732-RV4 (to be published as TIA-835.5-D), 72 pages.
Draft—TR45—PN-3-4732-RV4 (to be published as TIA-835.6-D), 36 pages.
3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.
3GPP2 X.S0011-001-D, 3rd Generation Partnership Project 2 '3GPP2', "cdma2000 Wireless IP Network Standard: Introduction," Version 1.0, 33 pages, Feb. 2006.
3GPP2 C.S0063-0, 3rd Generation Partnership Project 2 '3GPP2', "cdma2000 High Rate Packet Data Supplemental," Version 1.0, 121 pages, Mar. 2006.
3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 259 pages, Mar. 2006.
3GPP2 C.S0024-A, 3rd Generation Partnership Project 2 '3GPP2', "cdma2000 High Rate Packet Data Air Interface Specification," Version 2.0, 1,277 pages, Jul. 2005.
B. Aboba, et al., "Extensible Authentication Protocol (EAP)," Network Workikng Group, RFC 3748, http://www.ietf.org/rfc/rfc3748.txt, 59 pages, May 19, 2006.
B. Aboba, D. Simon, "PPP EAP TLS Authentication Protocol," Network Working Group, RFC 2716, http://www.ietf.org/rfc/rfc2716.txt, 22 pages, May 19, 2006.
W. Simpson, "PPP Challenge Handshake Authentication Protocol (CHAP)," Network Working Group, RFC 1994, http://www.ietf..org/rfc/rfc1994.txt, 12 pages, May 19, 2006.
W. Simpson, "The Point-to-Point (PPP)," Network Working Group, RFC 1661, http://www.ietf.org/rfc/rfc1661.txt, 47 pages, May 19, 2006.
P. Eronen, et al., "Diameter Extensible Authentication Protocol (EAP) Application," Network Working Group, RFC 4072, http://www.ietf.org/rfc/rfc4072.txt, 29 pages, May 19, 2006.
P. Calhoun, et al., "Diameter Base Protocol," Network Working Group, RFC 3588, http://www.ietf.org/rfc/rfc3588.txt, 129 pages, May 19, 2006.

PCT Notification of Transmittal of the International Search Report and the Written Opinion of the International Searching Authority, or the Declaration, International Application No. PCT/US07/05847, 9 pages, Oct. 26, 2007.
PCT Notification of Transmittal of the International Search Report and the Written Opinion of the International Searching Authority, or the Declaration, International Application No. PCT/US07/05849, 9 pages, Nov. 14, 2007.
Yegani et al., "System and Method for Handover of an Access Terminal in a Communication Network," U.S. Appl. No. 11/682,735, 24 pps, 3 pps drawings, filed Mar. 6, 2007.
Yegani et al., "Enforcement of User Level Policies from Visited Networks in a Mobile IP Environment," U.S. Appl. No. 11/682,817, 22 pps, 2 pps drawings, filed Mar. 6, 2007.
Yegani et al, Authentication of Access Terminals in a Cellular Communication Network,: U.S. Appl. No. 11/682,857, 28 pps, 5 pps drawings, filed Mar. 6, 2007.
Andreasen et al., "System and Method of Consolidating Accounting Data for a Communication Session," U.S. Appl. No. 11/714,974, 40 pps, 3 pps drawings, filed Mar. 6, 2007.
Panda et al., "System and Method for Capturing Accounting Data for a Communication Session," U.S. Appl. No. 11/715,018, filed Mar. 6, 2007.
Rosenberg et al., "System and Method for Determining a Network for Processing Applications for a Communication Session," U.S. Appl. No. 11/715,019, 40 pps, 3 pps drawings, filed Mar. 6, 2007.
Rosenberg et al., "Determining a Policy Output for a Communication Session," U.S. Appl. No. 11/715,032, 31 pps, 4 pps drawings, filed Mar. 6, 2007.
Leung et al., "Communicating Packets Using a Home Anchored Bearer Path," U.S. Appl. No. 11/715,033, 33 pps, 4 pps drawings, filed Mar. 6, 2007.
Andreasen et al., "Posture-Based Network Authentication," U.S. Appl. No. 11/715,040, 23 pp., 2 pps drawings, filed Mar. 6, 2007.
Iyer et al., "Access Terminal for Communicating Packets Using a Home Anchored Bearer Path," U.S. Appl. No. 11/715,041, 33 pps, 4 pps drawings, filed Mar. 6, 2007.
Rosenberg et al., "System and Method for Exchanging Policy Information in a Roaming Communications Environment," U.S. Appl. No. 11/715,056, 42 pps, 3 pps drawings, filed Mar. 6, 2007.
Rosenberg et al., "Establishing Facets of a Policy for a Communication Session," U.S. Appl. No. 11/715,065, 32 pps, 4 pps drawings, filed Mar. 6, 2007.
Rosenberg et al., "Performing Deep Packet Inspection for a Communication Session," U.S. Appl. No. 11/715,073, 31 pps, 4 pps drawings, filed Mar. 6, 2007.
Rosenberg et al., "Assigning a Serving- CSCF During Access Authentication," U.S. Appl. No. 11/715,074, 22 pps, 2 pps drawings, filed Mar. 6, 2007.
Rosenberg et al., "System and Method for Providing Emergency Services in a Visited Communications Environment," U.S. Appl. No. 11/715,111, 39 pps, 2 pps drawings, filed Mar. 6, 2007.
Panda et al., "Application-Aware Policy Enforcement," U.S. Appl. No. 11/715,187, 28 pps, 2 pps drawings, filed Mar. 6, 2007.
Andreasen et al., "System and Method for Generating a Unified Accounting Record for a Communication Session," U.S. Appl. No. 11/715,210, 46 pps, 3 pps drawings, filed Mar. 6, 2007.
Andreasen et al., "Network-triggered quality of service (QoS) Reservation," U.S. Appl. No. 11/715,250, 21 pps, 2 pps drawings, filed Mar. 6, 2007.
Andreasen et al.,; "Policy-Based Control of Content Intercept", U.S. Appl. No. 11/715,251, 23 pps, 2 pps drawings, filed Mar. 6, 2007.
Rosenberg et al., "System and Method for Network Charging Using Policy Peering," U.S. Appl. No. 11/715,256, 43 pps, 3 pps drawings, filed Mar. 6, 2007.
PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages.

Online Inc., "Apogee Releases Content Usage-Based Billing Product Annotated Title—Software allows content usage-based billing," EContent, vol. 24, No. 5, NDN 173-0356-6509-7, 1 pg, Jul. 2001.

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg, Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs, Jan. 1998.

Business Wire, "Apogee Networks Introduces Industry's First Content Usage-Based Billing Solution for Web Hosters," NDN 219-0281-6988-1, 2 pgs, May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs, Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs, Oct. 10, 2000.

Business Wire, "Apogee Networks Unveils NetCountant Wireless Billing At Supercomm; Company Demonstrates Industry First Wireless Content Usage Based Billing Solution," NDN 218-0324-8075-6, 2 pgs, Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs, Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs, Dec. 6, 2000.

Business Wire, "Apogee Networks Joins Content Alliance; Billing Expert to Join Industry Group Aimed At Advancing Content Networking," NDN 218-0181-2716-7, 3 pgs, Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs, Jun. 19, 2000.

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages, Oct. 25, 2007.

*USPTO; Office Action* dated Oct. 3, 2008 for U.S. Appl. No. 11/682,857, filed Mar. 6, 2007 in the name of Parviz Yegani; 22 pages, Oct. 3, 2008.

*USPTO; Office Action* dated Apr. 17, 2009 for U.S. Appl. No. 11/682,857, filed Mar. 6, 2007 in the name of Parviz Yegani; 18 pages, Apr. 17, 2009.

\* cited by examiner

FIG. 4

SYSTEM AND METHOD FOR ACCESS AUTHENTICATION IN A MOBILE WIRELESS NETWORK

CROSS-REFERENCE TO RELATED APPLICATION

This Application claims priority under 35 U.S.C. §119 of provisional application No. 60/780,176 filed Mar. 6, 2006, entitled VERIZON WIRELESS MULTI-MEDIA PLUS (MMD+) PROGRAM SYSTEM ARCHITECTURE DOCUMENT.

TECHNICAL FIELD OF THE INVENTION

This invention relates in general to mobile communications, and more particularly to a system and method for access authentication in a mobile wireless network.

BACKGROUND OF THE INVENTION

The phenomenal growth of information technology and the Internet, and the general population's desire for timely information services, create a need for a high performance wireless Internet technology.

Current CDMA2000 data networks, though, rely on the Point-to-Point Protocol (PPP) to establish wireless networking sessions. Such a reliance on PPP results in a significant performance bottleneck. PPP signaling is not optimized for a wireless environment, particularly for handoff scenarios. PPP authentication and call setup time may be in the order of several seconds, which is unacceptable for most real-time telephony applications. Moreover, a single PPP session requires substantial memory resources, and the PPP state machine is quite processing and memory intensive.

Accordingly, there is a need for improved systems and methods for access authentication in a mobile wireless network that reduce call setup times.

SUMMARY OF THE INVENTION

In accordance with the present invention, the disadvantages and problems associated with authentication and call setup in a mobile wireless network have been substantially reduced or eliminated. In particular, the present invention improves the speed of authentication and call setup by reducing or eliminating the PPP setup latency associated with current systems, and avoids unnecessary signaling exchanged between certain components in a mobile wireless network.

In accordance with one embodiment of the present invention, a method is provided for authenticating access in a mobile wireless network. In such an embodiment, the method comprises exchanging an extensible authentication protocol (EAP) packet with an access terminal over a high rate packet data radio link and a signaling interface through a radio access network, encapsulating the EAP packet in an authentication authorization and accounting (AAA) packet, and sending the AAA packet to an authentication server for authentication.

In accordance with another embodiment of the present invention, a gateway system is provided for facilitating authenticating access in a mobile wireless network. In such an embodiment, the gateway system comprises a radio access network interface, an authenticator, and an IP network interface. The radio access network is for exchanging an extensible authentication protocol (EAP) packet with an access terminal over a high rate packet data radio link and a signaling interface through a radio access network. The authenticator is for encapsulating the EAP packet in an authentication authorization and accounting (AAA) packet, and the IP network interface is for sending the AAA packet to an authentication server.

Important technical advantages of certain embodiments of the present invention include fast handoff between neighboring radio network controllers and IP gateways.

Other important technical advantages of certain embodiments of the present invention may include low-latency inter-technology handoff, such as between CDMA and WLAN networks. Moreover, certain embodiments may simplify the generation and distribution of keys used for network authentication, and may eliminate one or more interfaces between network components.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
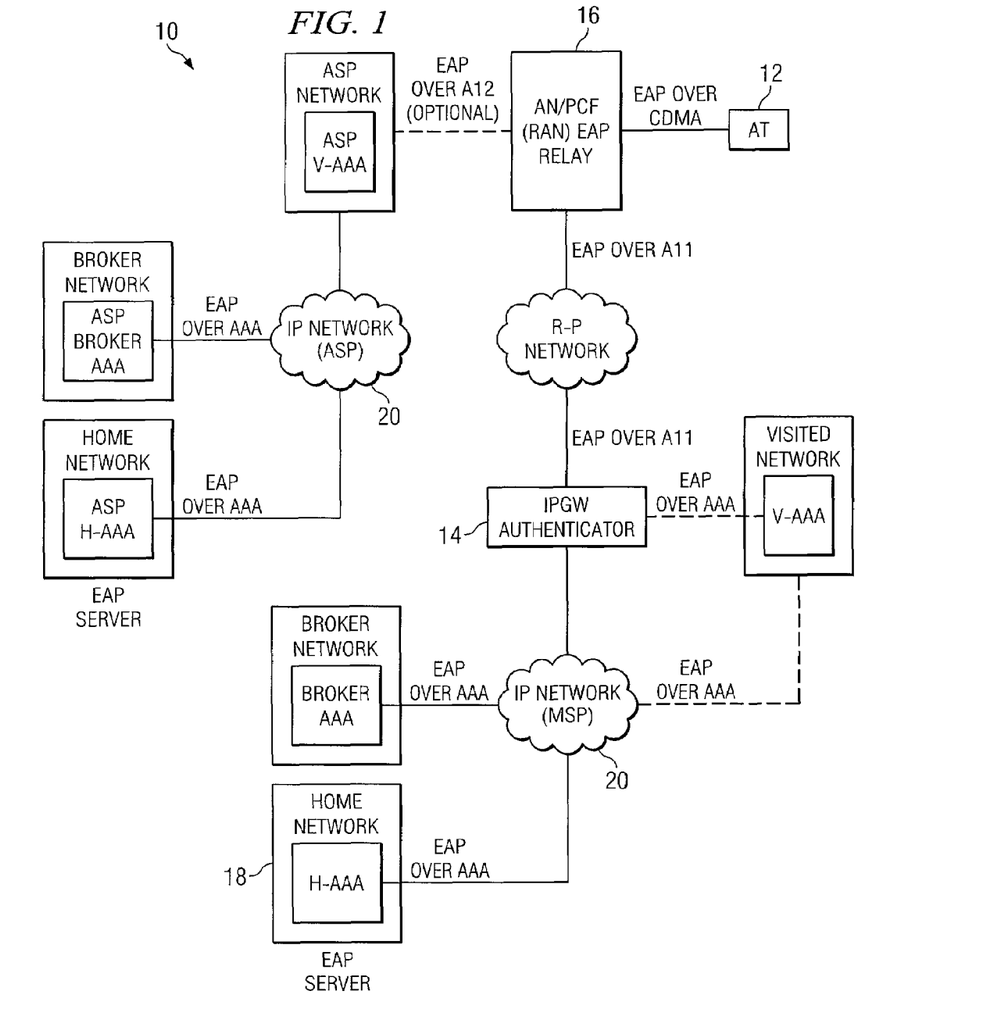
FIG. 1 is a simplified component diagram of an example mobile wireless communication system for exchanging data in accordance with certain teachings of the present invention.

FIG. 1 is a simplified component diagram of an example mobile wireless communication system 10 for exchanging data in accordance with certain teachings of the present invention. As FIG. 1 illustrates, one embodiment of the present invention comprises a High Rate Packet Data (HRPD) network that uses an authentication mechanism based on the Extensible Authentication Protocol (EAP). Such an embodiment may implement a three-way handshake between an access terminal (AT) 12, an IP gateway (IPGW) 14 (via a radio network controller (RNC) in a radio access network (RAN) 16), and an authentication server 18.

According to certain teachings of the present invention, EAP messages are carried over the air between AT 12 and RAN 16 using the HRPD over-the-air signaling protocol. EAP messages are transmitted over CDMA between AT 12 and RAN 16. AT 12 may act as an EAP peer, while RAN 16 may act as an EAP relay agent that forwards EAP messages to IPGW 14 via a signaling interface. One aspect of the present invention comprises an EAP-based authenticator that resides within IPGW 14. From IPGW 14, EAP messages may be carried over an Access Authentication & Accounting (AAA) protocol (such as RADIUS or DIAMETER) to authentication server 18, possibly through one or more AAA proxy servers (not pictured). According to certain teachings of the present invention, authentication server 18 may be an AAA server or a proprietary security manager, and provides the functions of an EAP server. In FIG. 1, authentication server 18 is depicted as a proprietary security manager in a home network ("H-SM").

EAP may be used for both device and service authentication. Accordingly, EAP may be used back-to-back, once for accessing RAN 16 (i.e. device authentication) and once for establishing an IP connection with IP network 20 (i.e. service authentication). As FIG. 1 illustrates, both authentication sequences may terminate in the same authentication server in a home network. Such double EAP authentication may be necessary before AT 12 is authorized to access IP services. Depending on the deployment scenario and the operator's authentication policy, it may be possible for AT 12 to perform a single EAP authentication, such as when AT 12 is authenticated either during device authentication or service authentication (but not both).

According to certain teachings of the present invention, the protocol used between AT 12 (an EAP peer) and IPGW 14 (an EAP authenticator) is based on EAP. EAP messages are encapsulated in HRPD packets for transport between AT 12 and RAN 16.

EAP over HRPD may be used to authenticate devices using the Enhanced Multi-Flow Packet Application in conjunction with HRPD Rev. A. According to teachings of the present invention, an EAP authenticator may be located in an IPGW and, accordingly, an HRPD RAN may relay EAP messages over an A11 interface to the EAP authenticator. An AAA client in the IPGW may then encapsulate the EAP messages in ARA packets and forward them to an EAP server in a home network for authentication. The protocol used between IPGW 14 and authentication server 18 may be based on DIAMETER (with support for EAP). If mobility service and access service are provided by the same operator, then only one EAP authentication may be required.

Alternatively, a RAN may use an A12 interface to carry device authentication within the Access Service Provider's network. Device authentication then may be terminated in an EAP server. In such a configuration, the EAP authenticator may be in the RAN and there may be no need to use the EAP relay function. Note, though, that if access service and mobility service are provided by the same operator, then there may be no need to use A12 for device authentication.

Figure 2:
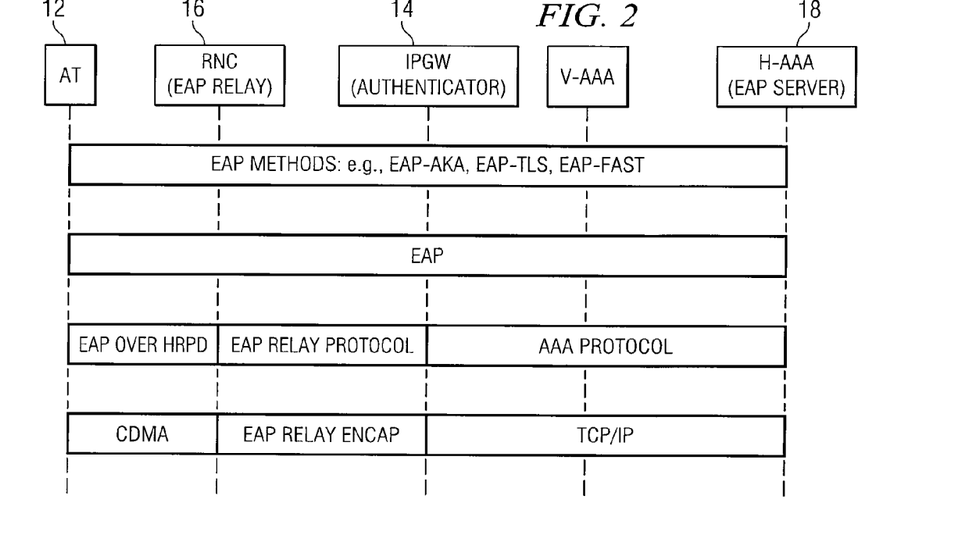
FIG. 2 is a sequence diagram that illustrates the various layers involved in the protocol operation for access authentication in certain embodiments of the present invention.

FIG. 2 is a sequence diagram that illustrates the various layers involved in the protocol operation for access authentication in certain embodiments of the present invention. More particularly, FIG. 2 illustrates layers involved in an EAP exchange between several EAP-based entities, including an EAP peer, an EAP relay, an EAP authenticator, and an EAP server. According to certain teachings of the present invention, an EAP peer may be implemented in an access terminal, an EAP relay may be implemented in an RNC, an EAP authenticator may be implemented in an IPGW, and an EAP server may be implemented in an authentication server (such as an AAA server or H-SM). FIG. 2 also depicts an authentication server located in a visited network (V-SM), which may or may not participate in an EAP exchange. As FIG. 2 demonstrates, EAP methods generally are encapsulated in EAP packets for transit between access terminal 12 (the EAP peer) and authentication server 18 (the EAP server). For transit between access terminal 12 and RAN 16, the EAP packets are further encapsulated in lower layer protocols (e.g. HRPD/CDMA). Upon reaching RAN 16, EAP packets are removed from the lower level packets used for transit between access terminal 12 and RAN 16, and are re-packaged in lower level protocols appropriate for transit between RAN 16 and IPGW 14. IPGW 14, in turn, removes the EAP packets from these lower level protocol packets and re-packages them for transit to authentication server 18. In certain embodiments, IPGW 14 packages these EAP packets in AAA packets and then encapsulates the AAA packets in TCP/IP packets (as shown in FIG. 2), which may be appropriate for DIAMETER-based authentication. Alternatively, IPGW 14 may encapsulate the AAA packets in other lower layer packets, such as UDP, which may be appropriate for RADIUS-based authentication.

Figure 3:
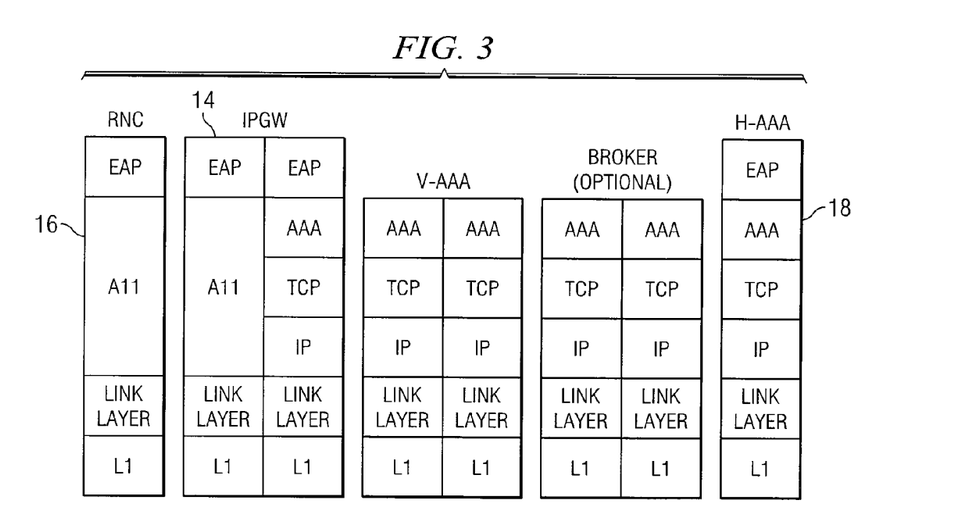
FIG. 3 is a simplified diagram that illustrates an AAA protocol stack for exchanging EAP messages in certain embodiments of the present invention.

FIG. 3 is a simplified diagram that illustrates an AAA protocol stack for exchanging EAP messages in certain embodiments of the present invention. FIG. 3 illustrates a variety of network interfaces that may exist between a RAN and an authentication server. As in FIG. 2, FIG. 3 demonstrates how EAP packets are encapsulated in various lower-level protocol packets for transport various network components of communication system 10. For instance, in RAN 16, EAP packets are encapsulated in signaling protocol packets (e.g. A11 packets) and other lower layer packets for transport to IPGW 16. IPGW 16 receives the lower layer packets and extracts the EAP packets. IPGW 16 then re-packages the EAP packets in authentication protocol packets (e.g. AAA packets) and other lower layer packets for transport through IP network 20. These packets may pass through several optional, intermediary components, but ultimately reach authentication server 18. Authentication server 18 then extracts the EAP packets from the lower layer packets, as depicted in FIG. 3.

In certain embodiments of the present invention, device authentication in communication system 10 may require an exchange of EAP messages between AT 12 and IPGW 14. In one embodiment, the EAP messages are carried in Mobile IP Vendor-Specific Extensions (VSEs) over an A11 interface, using existing messages. New VSEs may be defined and used for transporting EAP data over the A11 interface. EAP data may include EAP messages, as well as keys derived from the EAP exchange that are intended for RAN 16. EAP messages sent over an A11 interface also may need to be secured, particularly if mobility services and access services are operated by different entities.

EAP authentication may produce a Master Session Key (MSK) that is derived by the AT and authentication server. In accordance with certain teachings of the present invention, the authentication server transmits the key securely to the EAP authenticator residing in the IPGW. The authenticator may then use this key to derive other keys for traffic protection and other purposes. In certain embodiments, key material may be derived for the RAN and installed for on-the-air protection. An AT may use a similar key derivation to derive keys to match the keys derived by the network. Key derivation generally is the same if double or single authentication is used. Mobility keys may be derived from an Extended MSK by the EAP server residing in the authentication server. The server may use a root key to generate all other keys. Such keys may be bootstrapped during authentication and cached in the IPGW. EAP keys are generated both in the AT and in the EAP server.

Figure 4:
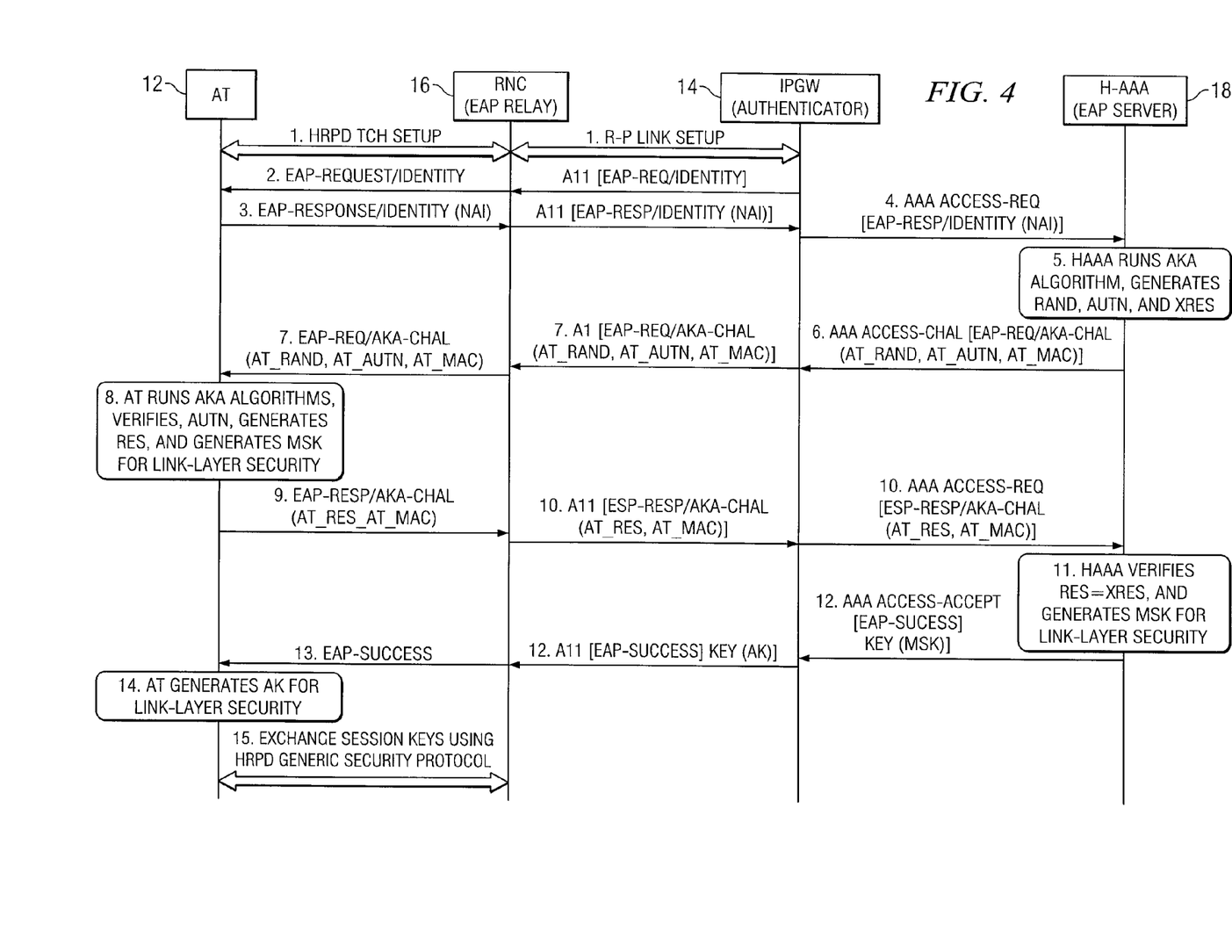
FIG. 4 is a sequence diagram that illustrates HRPD authentication according to one embodiment of the present invention using EAP and the AKA protocol.

FIG. 4 is a sequence diagram that illustrates HRPD authentication according to one embodiment of the present invention using EAP and the Authentication & Key Agreement (AKA) protocol. According to teachings of the present invention, IPGW 14 and access terminal 12 exchange EAP packets over a high rate packet data (HRPD) radio link and a signaling interface through RAN 16. IPGW 14 then encapsulates the EAP packets in an authentication protocol packet (e.g. an AAA packet) and sends the AAA packet to authentication server 18 for further processing. Authentication server 18, in turn, may authenticate access based on the EAP packets. In the embodiment depicted in FIG. 4, for instance, authentication server 18 may run an AKA algorithm to generate certain authentication challenges and responses, which are returned to access terminal 12 through IPGW 14 and RAN 16. Access terminal 12 then may verify the challenges and responses and generate its own authentication challenge and response, which is sent back to authentication server 18. As part of this exchange, authentication server 18 and access terminal 12 may mutually derive a session key. Authentication server 18 may then send this session key to IPGW 14 for use in establishing link layer security with access terminal 12.

AKA is based on challenge-response mechanisms and symmetric cryptography. Compared to legacy authentication methods, AKA generally provides stronger security with longer key lengths and the authentication of both client and server.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

For instance, example embodiments of the present invention have been described above in which EAP is used to provide a flexible authentication mechanism, but other protocols may be used instead of or in addition to EAP. In particular, any authentication protocol that supports multiple authentication mechanisms and dynamic negotiation of authentication mechanisms may be suitable for implementing the principles of the present invention. Moreover, the authentication mechanisms described herein are intended to be illustrative and not exclusive. Other authentication mechanisms, including other shared secret protocols and certificate-based mechanisms such as Transport Layer Security, may be used without departing from the spirit of the present invention.

What is claimed is:

1. A method for authenticating access in a mobile wireless network, the method comprising:
   receiving an extensible authentication protocol (EAP) packet from an access terminal over a high rate packet data radio link and an A11 signaling interface at an IP gateway through a radio access network, the A11 signaling interface having vendor-specific extensions for carrying the EAP packet;
   encapsulating the EAP packet in an authentication authorization and accounting (AAA) packet, the encapsulating done by the IP gateway; and
   sending the AAA packet from the IP gateway to an authentication server, the authentication server configured to authenticate both the access terminal and a service of the access terminal based on the EAP protocol.

2. The method of claim 1, wherein the signaling interface is an A11 signaling interface having vendor-specific extensions for carrying the EAP packet.

3. The method of claim 1, further comprising authenticating access based on the EAP packet, and exchanging additional EAP packets with the access terminal over the high rate packet data radio link and the signaling interface to establish a session key.

4. The method of claim 1, further comprising authenticating access based on the EAP packet, and exchanging additional EAP packets with the access terminal over the high rate packet data radio link and the signaling interface to establish a session key, wherein the signaling interface is an A11 signaling interface having vendor-specific extensions for carrying the EAP packet.

5. The method of claim 1, further comprising authenticating access based on the EAP packet and using a challenge-response protocol, and exchanging additional EAP packets with the access terminal over the high rate packet data radio link and the signaling interface to establish a session key.

6. The method of claim 1, further comprising authenticating access based on the EAP packet and using a challenge-response protocol with shared keys, and exchanging additional EAP packets with the access terminal over the high rate packet data radio link and the signaling interface to establish a session key.

7. The method of claim 1, further comprising authenticating access based on the EAP packet and using a certificate-based protocol, and exchanging additional EAP packets with the access terminal over the high rate packet data radio link and the signaling interface to establish a session key.

8. A gateway system for facilitating authenticating access in a mobile wireless network, the gateway system comprising:
   an IP gateway for receiving an extensible authentication protocol (EAP) packet from an access terminal, the EAP packet received through a radio access network over a high rate packet data radio link and an A11 signaling interface having vendor-specific extensions for carrying the EAP packet;
   an authenticator of the IP gateway for encapsulating the EAP packet in an authentication authorization and accounting (AAA) packet; and
   an IP network interface for sending the AAA packet from the IP gateway to an authentication server, the authentication server configured to authenticate both the access terminal and a service of the access terminal based on the EAP protocol.

9. The gateway system of claim 8, wherein the signaling interface is an A11 signaling interface having vendor-specific extensions for carrying the EAP packet.

10. The gateway system of claim 8, wherein the IP network interface is further operable to receive a session key from the authentication server, and wherein the radio access network interface is further operable to send an authentication success signal to the access terminal over the high rate packet data radio link and the signaling interface.

11. The gateway system of claim 8, wherein the signaling interface is an A11 signaling interface having vendor-specific extensions for carrying the EAP packet.

12. A system for authenticating access in a mobile wireless network, the system comprising:
   a radio network controller;
   an authentication server; and
   an IP gateway coupled to the radio network controller and the authentication server;
   wherein the IP gateway is operable to exchange an extensible authentication protocol (EAP) packet with an access terminal through the radio network controller over a high rate packet data radio link and an A11 signaling interface having vendor-specific extensions for carrying the EAP packet, encapsulate the EAP packet in an authentication authorization and accounting (AAA) packet, and send the AAA packet to the authentication server, the authentication server configured to authenticate both the access terminal and a service of the access terminal based on the EAP protocol.

13. The system of claim 12, wherein the signaling interface is an A11 signaling interface having vendor-specific extensions for carrying the EAP packet.

14. The system of claim 12, wherein the authentication server is operable to authenticate access based on the EAP packet, and to exchange additional EAP packets with the access terminal through the IP gateway and the radio network controller over the high rate packet data radio link and the signaling interface to establish a session key.

15. The system of claim 12, wherein the authentication server is operable to authenticate access based on the EAP packet, and to exchange additional EAP packets with the access terminal through the IP gateway and the radio network controller over the high rate packet data radio link and the signaling interface to establish a session key; wherein the signaling interface is an A11 signaling interface having vendor-specific extensions for carrying the EAP packets.

16. The system of claim 12, wherein the authentication server is operable to authenticate access based on the EAP packet and using a challenge-response protocol, and to exchange additional EAP packets with the access terminal through the IP gateway and the radio network controller over the high rate packet data radio link and the signaling interface to establish a session key.

17. The system of claim 12, wherein the authentication server is operable to authenticate access based on the EAP packet and using a challenge-response protocol with shared keys, and to exchange additional EAP packets with the access terminal through the IP gateway and the radio network controller over the high rate packet data radio link and the signaling interface to establish a session key.

18. The system of claim 12, wherein the authentication server is operable to authenticate access based on the EAP packet and using a certificate-based protocol, and to exchange additional EAP packets with the access terminal through the IP gateway and the radio network controller over the high rate packet data radio link and the signaling interface to establish a session key.

19. The system of claim 12, wherein the authentication server is operable to authenticate access based on the EAP packet and using a challenge-response protocol, and to exchange additional EAP packets with the access terminal through the IP gateway and the radio network controller over the high rate packet data radio link and the signaling interface to establish a session key; wherein the additional EAP packets are encapsulated in AAA packets for transmission between the IP gateway and the authentication server; and wherein the signaling interface is an A11 signaling interface having vendor-specific extensions for carrying the EAP packets.

20. A system for authenticating access in a mobile wireless network, the system comprising:
    means for receiving an extensible authentication protocol (EAP) packet at an IP gateway from an access terminal; and
    means for sending the LAP packet from an IP gateway to an authentication server in an authentication authorization and accounting (AAA) packet, the authentication server configured to authenticate both the access terminal and a service of the access terminal based on the EAP protocol.

21. The system of claim 20, further comprising means for authenticating the EAP packet, and means for establishing a session key with the access terminal if authentication is successful.

* * * * *